United States Patent [19]

Magocs

[11] Patent Number: 5,619,284
[45] Date of Patent: Apr. 8, 1997

[54] BEAM COMBINER FOR LCD PROJECTOR UTILIZING A PENTA-PRISM

[75] Inventor: Stephen Magocs, Knoxville, Tenn.

[73] Assignee: Philips Electronics North America Corporation, New York, N.Y.

[21] Appl. No.: 375,333

[22] Filed: Jan. 17, 1995

[51] Int. Cl.⁶ .............................. H04N 5/74; H04N 9/31
[52] U.S. Cl. .................. 348/757; 348/751; 359/634; 349/7
[58] Field of Search .................... 348/750, 751, 348/756, 757, 761, 779, 780; 359/634, 636, 639, 640, 40, 41; H04N 5/74, 9/31

[56] References Cited

U.S. PATENT DOCUMENTS

| | | | |
|---|---|---|---|
| 4,687,301 | 8/1987 | Ledebuhr | 350/401 |
| 4,882,617 | 11/1989 | Vriens | 348/751 |
| 5,012,274 | 4/1991 | Dolgoff | 340/702 |
| 5,084,807 | 1/1992 | McKechnie et al. | 362/228 |

OTHER PUBLICATIONS

Journal of the International Society of Optical Engineering, Sep. 1994, vol. 33, No. 9.

*Primary Examiner*—Michael H. Lee
*Attorney, Agent, or Firm*—Michael E. Marion

[57] ABSTRACT

A beam combiner for an LCD projection television system makes use of a penta-prism which focuses three separate light sources on a viewing screen. The use of a penta-prism as a beam combiner allows for a compact light path, simplicity of manufacturing and a cost effective dichroic mirror arrangement as part of the penta prism. The light path within the penta-prism from the three light sources forms a right-angled triangle which provides the above-identified advantages.

10 Claims, 3 Drawing Sheets

BEAM COMBINER FOR LCD PROJECTOR UTILIZING A PENTA-PRISM

FIELD OF INVENTION

This invention relates to video color projection systems, both front projection and rear projection and, more particularly, to a beam combiner for an LCD projection television system that utilizes a penta-prism.

BACKGROUND OF THE INVENTION

Various types of projection television systems have been developed and commercialized in recent years. Although such projection television systems provide a large viewing screen, they tend to be more expensive than standard CRT based systems, are more cumbersome and, most importantly, they tend to provide a relatively dim image on the viewing screen. The image produced, as well as the expense and size of a projection television system, is often directly dependent on the optical system used in such systems.

An example of an optical system in a prior art system is described in U.S. Pat. No. 5,084,807, granted to Thomas S. McKechnie on Jan. 28, 1992. The prior art system described in U.S. Pat. No. 5,084,807, is illustrated in FIG. 1 of the patent, and describes an arrangement in which light from three tungston halogen lamps is transmitted and/or reflected through a crossed pair of dichroic mirrors and a dichroic prism to pass through three Liquid Crystal Displays (LCD's). The three LCD's modulate three channels to create the red, green and blue portions of a television picture.

The crossed dichroic mirrors break the white light source into red, blue and green portions of the spectrum. These three color portions are then recombined by way of the dichroic prism and the recombined light is projected by way of a projection lens to a projection screen.

Although this prior system has many advantages, the use of a first set of crossed dichroic mirrors and a second dichroic mirror prism adds to the complexity and size of the device and also, of course, to the expense of the completed projection television system.

Another prior art system is described in U.S. Pat. No. 4,687,301, granted to Ledebuhr on Aug. 18, 1987. This patent describes a plumicon prism based LCD projector. With this type of system, a substantial amount of glass is used which makes the prism arrangement large and very expensive which is, of course, a disadvantage in a projection television system.

Another prior art LCD projection system is described in U.S. Pat. No. 5,012,274, granted to E. Dolgoff on Apr. 30, 1991. The system described in this patent utilizes three LCD's, one displaying red, one green and one blue, picture data. Each of the LCD's is illuminated with light of the appropriate color, i.e., a red light source, a blue light source, and a green light source. Light from the red, green and blue light sources, is collected by a condenser, collimated by collimating optics, and passed through a series of dichroic mirrors to form a full color image on a screen.

Although the system described in this patent also has been widely used, there are certain disadvantages. More particularly, the back focus of the projection lens used is much larger than what would be found, for example, in other prism designs. This makes the design and production of such a system very expensive. In essence, the long back focus of the projection lens leads to problems in producing a commercial and reliable projection television system.

It is, therefore, an object of this invention to provide a beam combiner for an LCD projector, which is useful for both front and rear projection, but has a compact light path and is simple to manufacture.

It is a further object of the instant invention to produce an LCD color projection television system that has a cost effective dichroic mirror system.

It is a still further object of the instant invention to provide a dichroic combiner for a projection television system that is simple, inexpensive, easy to manufacture, and which will result in a cabinet size for a commercial projection system that is acceptable to the consumer.

Another prior art optical system, remote from the projection television field, is described in the Journal of the International Society of Optical Engineering, September 1994, Volume 33, Number 9. This system does not relate to projection television systems, but describes a single axis, three color light source system suitable for high speed photography.

The system described is an optical arrangement which consists of three white light sources, a number of collimating lenses, and three dichroic filters mounted in a penta holder. Light from a first source passes through the first collimating lens producing a parallel beam of light. This light is then passed through a dichroic filter, which is made to transmit red light only, while reflecting blue and green light. The transmitted red light reflects off the inner surface of a second dichroic filter which transmits only green light reflecting red and blue. Finally, the red beam reflects off a third filter, which is manufactured to transmit only blue light. The combined red, green and blue light sources pass out of the penta arrangement, where it is focused with a collimating lens.

This system, requires the dichroic filters to be specially manufactured as their performance is very sensitive to the light incident angle. In addition, the penta holder described in this reference must be very accurately machined from a stainless steel block and the critical components and light sources are mounted on rods screwed into the block. Accordingly, although this system presents a optical arrangement which may be of interest in a projection television system, it would obviously be very expensive and require special manufacturing techniques, all of which would be unsuitable for use in a commercial projection television system.

SUMMARY OF THE INVENTION

In accordance with the invention, there is provided a beam combiner for an LCD projection television system which is based on the use of a penta-prism.

Three collimated light sources, red, green and blue, are directed through three LCD display devices and impact upon three dichroic mirrors forming three sides of the penta-prism.

Red light passes through a first dichroic mirror and is reflected from second and third dichroic mirrors at an angle of 45° and is thereafter directed to a display screen. Green light passes through the second dichroic mirror, is reflected from the third dichroic mirror at an angle of 45°, and is thereafter directed to a display screen. Similarly, blue light passes through the third dichroic mirror and is directed to the display screen.

It is an advantage and feature of the invention that the light path for light from the red, green and blue light sources form a right-angled triangle within the penta-prism.

It is a further feature of the invention that the use of a penta-prism as a beam combiner provides a compact light path in a projection television system which is simple to manufacture and has a cost effective dichroic mirror arrangement.

It is another feature of the invention that the first red dichroic mirror is optional in the construction of the inventive projection television system as it functions only as a red filter which may be placed on the second green dichroic mirror.

These and other objects and features of the invention will be more fully appreciated from the following detailed description, when taken in conjunction with the accompanying drawings, in which:

DETAILED DESCRIPTION OF INVENTION

Figure 1:
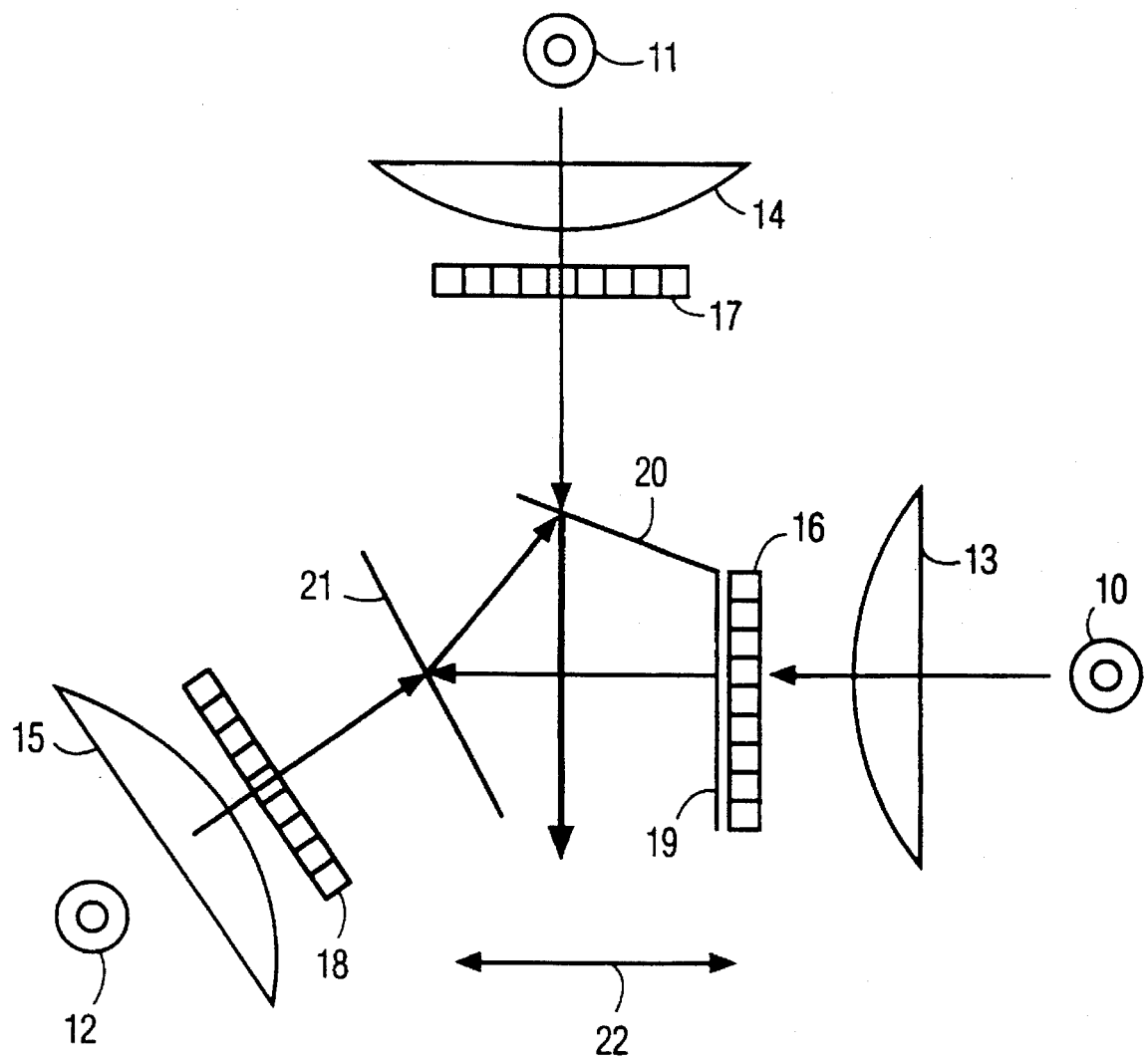
FIG. 1 illustrates the use of a penta-prism as a beam combiner in a projection television system.
Figure 1:
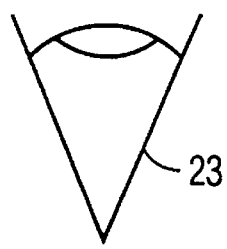

Referring now to FIG. 1, there is shown a beam combiner for an LCD projection television system based on use of a penta-prism in accordance with the instant invention.

It is to be understood that what is shown in FIG. 1 is essentially the dichroic combiner for use in a projection television system, which will be explained in detail below. The remaining portions of a projection television system are well known and will not be further described herein.

The system contains three light sources 10, 11 and 12. These light sources can be of any standard type for use in projection t.v. systems, but preferred light sources would be metal halide arc lamps with an arc in the range of 1–3 mm. Such light sources could transmit white light or, for example, could be one red, one green and one blue light source, with it being understood that the red light source would consist of light source 10, the blue light source would consist of light source 11, and the green light source would consist of light source 12. The light from each of the three light sources is collimated by collimating optics 13, 14 and 15. After the light is collimated, the light is applied to three LCD's shown respectively at 16, 17 and 18. The three LCD's modulate the three channels to create the red, green and blue portions of the resulting t.v. picture.

After the light passes through the three LCD's, 16, 17 and 18, the light is then applied to dichroic mirrors 19, 20 and 21. Dichroic mirror 19 transmits red light and is also a red edge filter. Dichroic mirror 21 reflects red light and transmits green light. Similarly, dichroic mirror 20 reflects red and green light and transmits blue light.

The red light from source 10 accordingly passes through LCD 16 and dichroic mirror 19, is reflected off dichroic mirror 21 and 20 and then is directed towards projection lens 22. Similarly, the blue light from source 11 passes through dichroic mirror 20, which reflects the red and green light, and is directed towards projection lens 22. Also, the green light from light source 12, passes through LCD 18, through dichroic mirror 21, then is reflected off dichroic mirror 20 and is accordingly directed to projection lens 22. Shown at 23, is the viewer which will be able to view the television picture on an appropriate display screen.

FIG. 1 illustrates that the dichroic mirrors shown therein, namely mirrors 19, 20 and 21, form three sides of a penta-prism which results in substantial advantages both in size, cost and complexity when producing a projection t.v. system. The specific angles for the dichroic mirrors will be described below with respect to FIG. 2.

Figure 2:
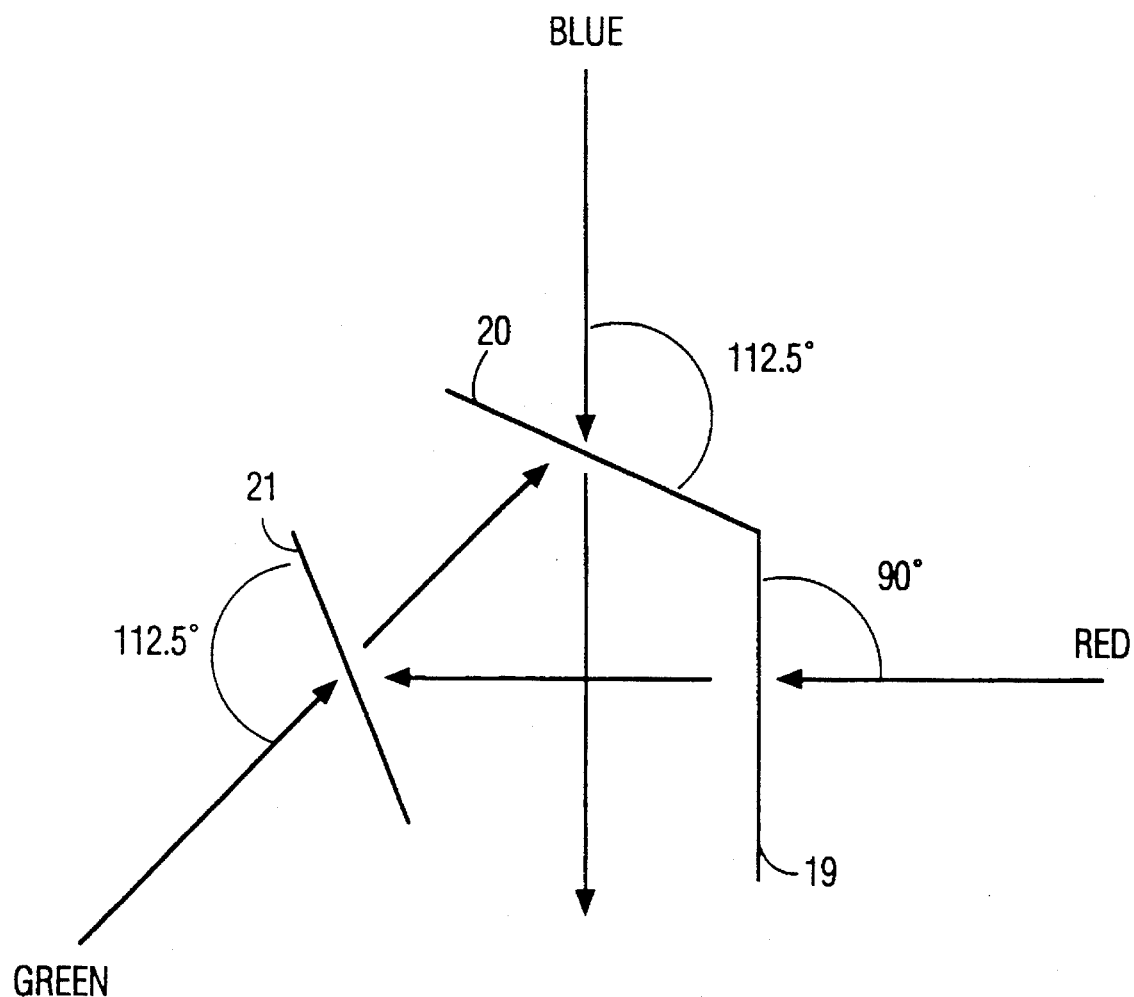
FIG. 2 illustrates the specific geometry for use with the penta-prism.

Referring now to FIG. 2, there is shown dichroic mirrors 19, 20 and 21, which refer to the similar identified dichroic mirrors shown in FIG. 1. As shown, the red light source has an angle of 90° with respect to dichroic mirror 19. Similarly, the blue light source has an angle of 112.5° with respect to dichroic mirror 20. Finally, the green light source has an angle of 112.5° with respect to dichroic mirror 21. Again, as described above, the red light source passes through dichroic mirror 20, is reflected off dichroic mirrors 21 and 20 at an angle of 45° and, thereafter, is directed downward towards the projection lens shown at 22 in FIG. 1. Similarly, the blue light source passes through dichroic mirror 20, and is directed towards the projection lens, while the green light source passes through dichroic mirror 21, is reflected off dichroic mirror 20 at an angle of 45°, and is also directed to projection lens 22. The combination of the penta-prism arrangement shown at 24 in FIG. 2 accordingly produces a complete television picture from the three light sources.

it is important to note that the light path for the red light source inside the penta-prism forms three sides of a right-angled triangle, the light path from the green light source forms two sides of a right angled triangle, while the light path from the blue light source forms one side of a right-angled triangle.

The advantage of using a penta-prism beam combiner is that it can be used in both a front or rear projection system, has a very compact light path in the form of a right-angled triangle, is simple to manufacture and utilizes cost effective dichroics.

It should also be noted that the red dichroic mirror is optional since it is only a red filter and, thus, it could be placed on the green dichroic mirror as described above.

It is preferred that the angular tolerance for the dichroic mirrors be in the range of 5–10arc minutes with the flatness being in the order of 10 full waves across each face of each of the mirrors.

Figure 3A:
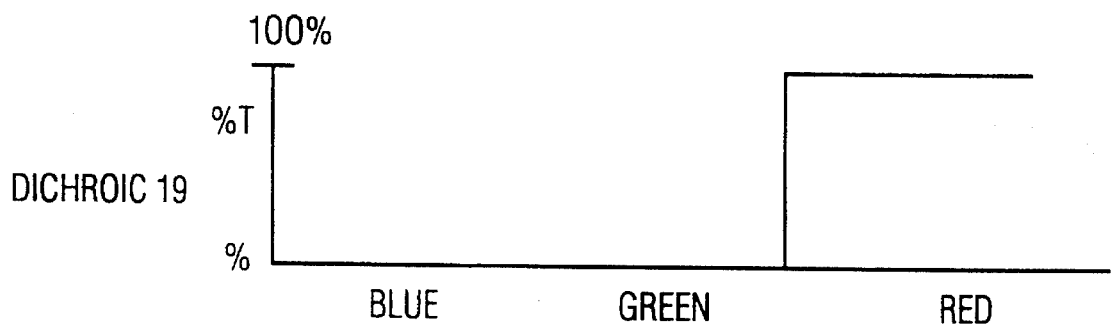
FIGS. 3A–3C illustrate the transmission characteristics of the dichroic mirrors used with the instant invention.
Figure 3B:
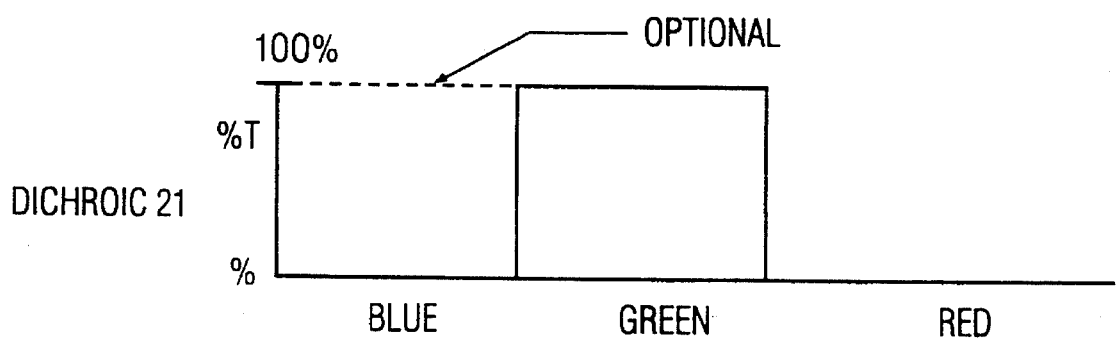
Figure 3C:
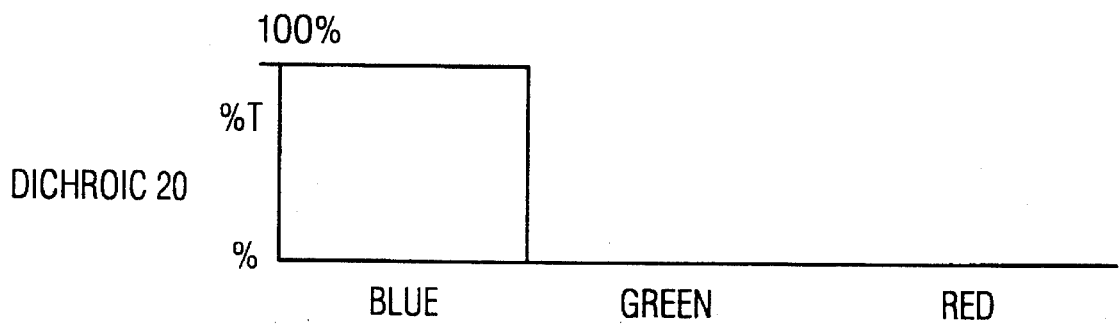

Referring now to FIG. 3, there is shown the transmission characteristics of the dichroic mirrors described above with respect to FIGS. 1 and 2. More particularly, dichroic 19 is shown in FIG. 3A, with reflectivity of blue and green, and transmitting red from the light source. Dichroic 21 transmits green and reflects blue and red with the use of an optional red filter. Similarly, as shown in FIG. 3C, dichroic 20 transmits blue and reflects green and red.

The foregoing disclosure and description of the invention is illustrated and explanatory thereof, and various changes in the size, shape and materials, as well as in the details of the illustrated construction may be made within the scope of the appended claims without departing from the spirit of the invention.

What is claimed is:

1. Apparatus for projecting on a display screen a composite color video image, comprising:

a plurality of liquid crystal display (LCD) devices, each of said LCD devices having a plurality of pixels arranged in a matrix for framing an image;

a plurality of light sources, each light source directing collimated light through a respective one of said LCD devices; and, a dichroic combiner arranged in the form of a penta-prism for receiving and combining said collimated light which passes through each of said LCD devices, and for directing the combined light to a display screen.

2. Apparatus in accordance with claim 1, wherein said plurality of light sources includes a red light source, a green light source, and a blue light source.

3. Apparatus in accordance with claim 2, wherein said dichroic combiner includes a first dichroic mirror which transmits red light, a second dichroic mirror which reflects red light and transmits green light, and a third dichroic mirror which transmits blue light and reflects red and green light.

4. Apparatus in accordance with claim 3, wherein light from said red light source impacts said first dichroic mirror at an angle of 90°, light from said green light source impacts said second dichroic mirror at an angle of 112.5°, and light from said blue light source impacts said third dichroic mirror at an angle of 112.5°.

5. Apparatus in accordance with claim 4, wherein light from said red light source is transmitted through said first dichroic mirror, is reflected from said second dichroic mirror at an angle of 45°, is reflected from said third dichroic mirror at an angle of 45°, and impacts upon said display screen at an angle of 90°.

6. Apparatus in accordance with claim 5, wherein light from said blue light source is transmitted through said third dichroic mirror and impacts upon said display screen at an angle of 90°.

7. Apparatus in accordance with claim 6, wherein light from said green light source is transmitted through said second dichroic mirror, is reflected from said third dichroic mirror of an angle of 45° and impacts upon said display screen at an angle of 90°.

8. Apparatus in accordance with claim 7, wherein said first, second and third dichroic mirrors comprise three sides of said penta-prism.

9. Apparatus in accordance with claim 8, wherein a light path for light from said red light source which is transmitted through said first dichroic mirror, reflected from said second dichroic mirror, reflected from said third dichroic mirror, and directed towards said display screen form three sides of a right-angled triangle.

10. Apparatus in accordance with claim 9, wherein a light path for light from said green light source, which is transmitted through said second dichroic mirror, reflected from said third dichroic mirror, and directed towards said display screen, forms two sides of a right-angled triangle, while a light path for light from said blue light source, which is transmitted through said third dichroic mirror, and directed towards said display screen, forms one side of a right-angled triangle.

\* \* \* \* \*